May 4, 1954 W. C. CONKLING 2,677,462
SIEVE
Filed April 24, 1951 3 Sheets-Sheet 1

INVENTOR.
William C. Conkling
BY Popp and Sommer
ATTORNEYS.

May 4, 1954   W. C. CONKLING   2,677,462
SIEVE

Filed April 24, 1951   3 Sheets-Sheet 2

INVENTOR.
William C. Conkling
BY
Popp and Sommer
Attorneys.

May 4, 1954 — W. C. CONKLING — 2,677,462
SIEVE

Filed April 24, 1951 — 3 Sheets-Sheet 3

INVENTOR.
William C. Conkling
BY
Popp and Sommer
Attorneys.

Patented May 4, 1954

2,677,462

UNITED STATES PATENT OFFICE 2,677,462

SIEVE

William C. Conkling, Lockport, N. Y., assignor to Richmond Manufacturing Company, Lockport, N. Y., a corporation of New York Application April 24, 1951, Serial No. 222,662

2 Claims. (Cl. 209—403)

This invention relates to improvements in sieves used in gyrating or reciprocating shake sifters or bolting equipment.

In particular the present invention is concerned with improving the construction of the screen in such a sieve and also the seal between adjacent sieves in a stack of sieves.

The customary construction of a sieve for use in gyrating or reciprocating shake sifters includes a sieve frame on which a screen is removably arranged. Heretofore it has been the general practice to construct the frame of the sieve and screen of wood. However, such arrangement has not proven fully satisfactory for such reasons, among others, as the wooden frames being prone to warp and distort are relatively susceptible to damage easily. In connection with warpage or distortion of the screen frame it will be seen that this would either loosen or excessively tighten the clothing of the screen and produce wrinkles therein, all of which tends to decrease the efficiency of the equipment. Moreover, warpage or distortion of the wooden framing destroys the proper fitting of the screen on the sieve frame, in some cases even preventing their assembly, and this condition also interferes with the seal desired between adjacent sieves in a stack of sieves arranged in a shake sifter.

It is accordingly an important object of the present invention to provide a sieve in which the frame of the sieve and the screen are constructed entirely of metal, thereby providing a construction which is inherently strong, durable, and free from warpage and distortion under ordinary conditions of use.

Another object is to provide an all-metal construction of screen frame which permits the screen clothing to be easily and removably secured to the screen frame so that the screen clothing can be replaced and thus permit the screen frame to be reused many times.

Another object is to provide such a screen in which the fastenings for the screen clothing are ordinary tacks which can be easily applied around the perimeter of the screen clothing with an ordinary hammer and therefore no special tools are required to apply the screen clothing to the screen frame, such an arrangement having the further advantages of requiring only a simple make up of the screen clothing and permitting the screen clothing to be drawn tight or stretched to the desired degree of tautness as it is fastened to the screen frame.

Another object is to provide such a construction of sieve so that when a plurality of such sieves are arranged in a stack, all tacks are covered and hence are not capable of becoming dislodged to enter the material being sifted, and the screen is effectively sealed against the frame of the adjacent sieve in such stack.

Another object is to provide such a sieve in which the screen cleaner carrier is mounted on the screen frame in a novel manner and is readily removable for replacement of the screen cleaners carried thereby or for permitting access to the interior of the screen frame without requiring removal of the screen clothing.

A further object is to provide such a screen which is simple in construction and inexpensive to manufacture.

Other objects and advantages of the invention will be apparent from the following description and accompanying drawings in which.

Figure 1:
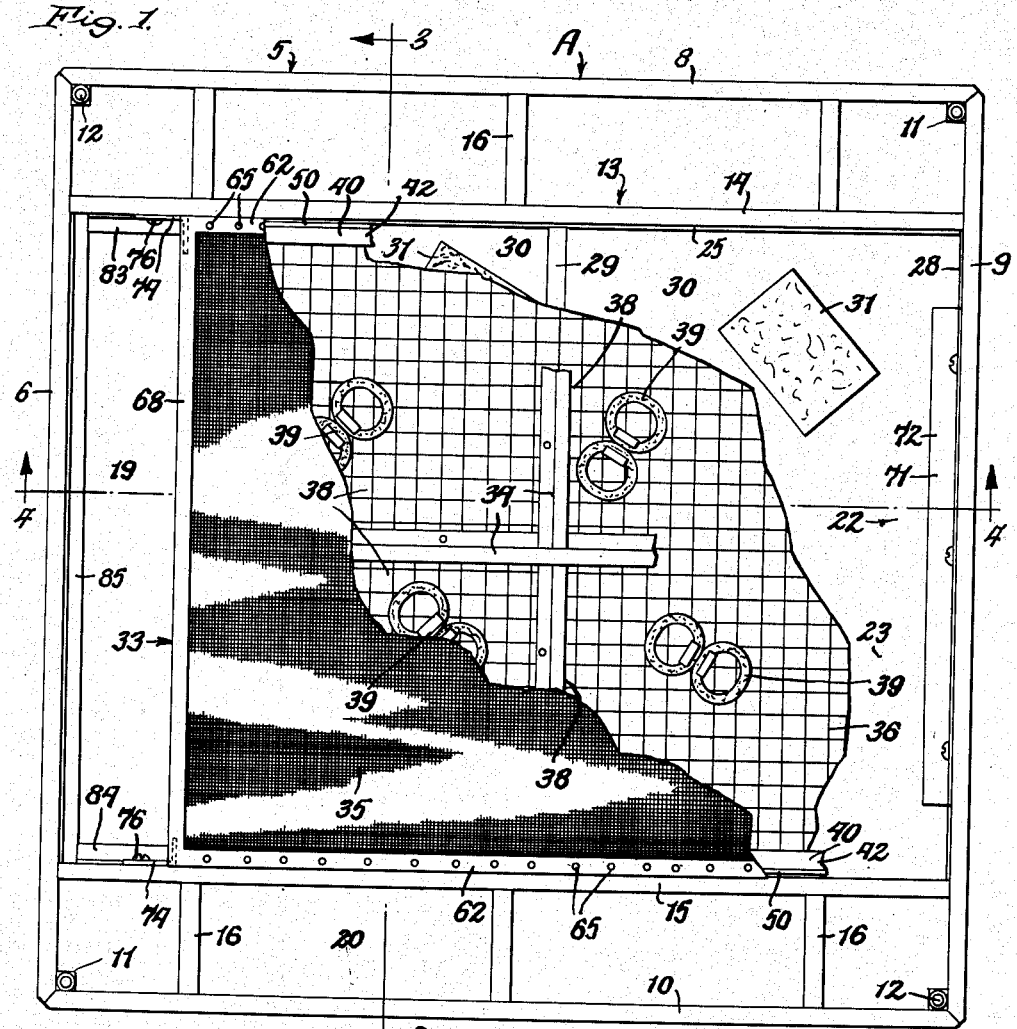
Fig. 1 is a top plan view of a stack of sieves for a gyrating or reciprocating shake sifter embodying the features of the present invention, parts being broken away to better disclose the inner construction of the top sieve.

In the illustration of the invention in the accompanying drawings, two similar sieves are shown as arranged one above the other to form a stack, the upper sieve being designated A and the lower sieve being designated B. Of course, the stack may contain any number of sieves desired. Inasmuch as the sieves A and B are substantially identical in construction, only a detailed description of the upper sieve A will be made and the same reference characters will be applied to indicate like parts in the two sieves. The differences in construction of the two sieves, which involves merely the provision of "rights" and "lefts" for alternate sieves, will be pointed out hereinafter.

In accordance with the invention, each sieve is constructed entirely of metal parts and is shown as comprising an outer rectangular metal frame 5 composed of four horizontal metal channels 6, 8, 9 and 10 which have their ends welded together and are arranged with their longitudinal edge flanges projecting outwardly. A vertical metal stem or block 11 is welded in each corner of the outer sieve frame 5, each having an upwardly projecting pin 12, at its upper end. The lower end of each stem or block 11 terminates above the lower surface of the sieve frame to provide a corner socket 4 (Fig. 2) adapted to receive the corresponding pin 12 on the next succeeding lower sieve to insure proper register of all of the sieves in a stack of such sieves. Thus the upwardly projecting pins 12 of the lower stack B are received in the corners or sockets 4 at the bottom of the upper sieve A so as to interconnect these sieves and prevent lateral displacement of one relative to the other.

The inner rectangular metal frame 13 of each sieve is shown as comprising a pair of horizontal metal channel bars 14 and 15 each welded at its opposite ends to the inner faces of the channel bars 6 and 9 of the rectangular outer frame and in spaced relation to the corresponding outer frame channel bars 8 and 10, respectively. These metal channel bars 14 and 15 of the inner sieve frame are arranged with their longitudinal edge flanges projecting outwardly and are held in spaced relation to the corresponding channel bars 8 and 10 by a plurality of short horizontal spacer bars 16. A horizontal metal angle bar 17 (Fig. 2) is provided at its ends with ears 18 (Fig. 4) which in turn are welded to the opposing faces of the channel bars 14 and 15 of the inner sieve frame in spaced relation to the channel bar 6. This angle bar 17 forms with the channel bars 6, 14 and 15 a vertical overs opening 19 through which the oversize material or overs rejected by the screen escape. The throughs or material passing through the screen escape through a vertical throughs channel 20 formed by the channel bars 10, 15, 6 and 9.

A pan cleaner retainer is arranged in this vertical throughs channel 20 and across a horizontal central rectangular opening 21 in the channel bar 15 and through which the throughs are directed by an inclined pan 22. This pan comprises a rectangular bottom 23 which slopes downwardly toward the opening 21 and is provided with a downwardly projecting lip 24 which overhangs the lower edge of this opening 21 in the channel bar 15. The opposite edge of this inclined pan 22 is bent upwardly to provide an upwardly directed flange 25 which can be welded to the face of the channel bar 14. The inclined pan 22 is likewise provided with upwardly directed side flanges 26 and 28 which are welded to the inner or opposing faces of the angle bar 17 and channel bar 9, respectively. This pan can also be reinforced by an internal angle bar 29 which is welded to its upper face and extends down its incline toward the opening 21. This reinforcing cross bar 29 welded to the upper face of the pan 22 provides two chambers 30, 30 above the pan each of which contains a pan cleaner 31. These pan cleaners can be of any conventional form and are shown as being in the form of rectangular strips of leather.

Figure 3:
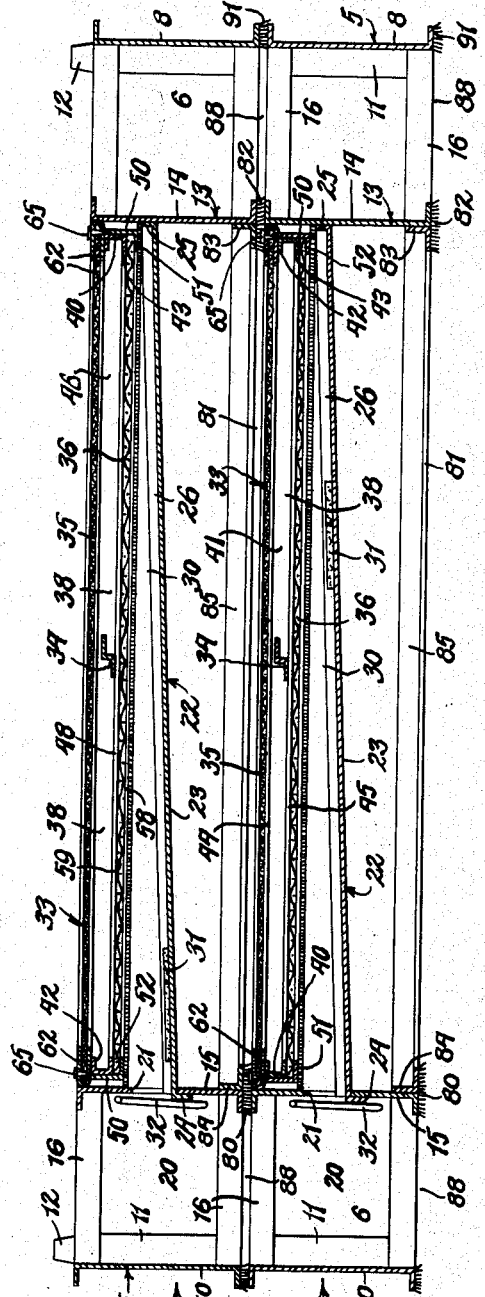
Fig. 3 is a vertical sectional view through the stack of sieves shown in Fig. 1, two sieves, one superimposed on the other in relative operative relation, being shown, this view being taken on line 3—3 of Fig. 1.

The retainer for retaining the pan cleaners 31 is designated at 32 in Fig. 3. This pan cleaner retainer is preferably made in the manner shown in my copending application for Retainer for Pan Cleaners in Sieves, Serial No. 222,661 filed April 24, 1951, and to which reference is made for a more detailed description of this retainer. In general it consists of a length of wire bent into zig-zag form so as to extend across the opening 21, and is suitably anchored at its ends.

Important features of the present invention reside in the construction of the screen, indicated generally at 33. This screen is removably arranged on the sieve frame. The screen 33 comprises a rectangular metal frame reinforced by internal cross bars 34 which are arranged at right angles to each other. The metal screen frame has a piece of screen clothing, such as a bolting silk 35, secured to and extending over its upper side, and also has a cleaner carrier in the form of a coarse mesh screen 36 mounted on and extending across its underside. The four compartments 38 in the screen formed by the rectangular frame thereof, the cross bars 34, the clothing 35 and the coarse screen 36 each contains a screen cleaner which can be of any conventional form, such as the figure 8 leather screen cleaners 39 shown. These screen cleaners 39 are supported by the coarse screen 36 which therefore acts as a screen cleaner carrier and these screen cleaners act against the underside of the bolting silk or clothing 35 as the sifter is gyrated or shaken to keep the clothing from blinding and at uniform screen efficiency.

Figures 5, 7:
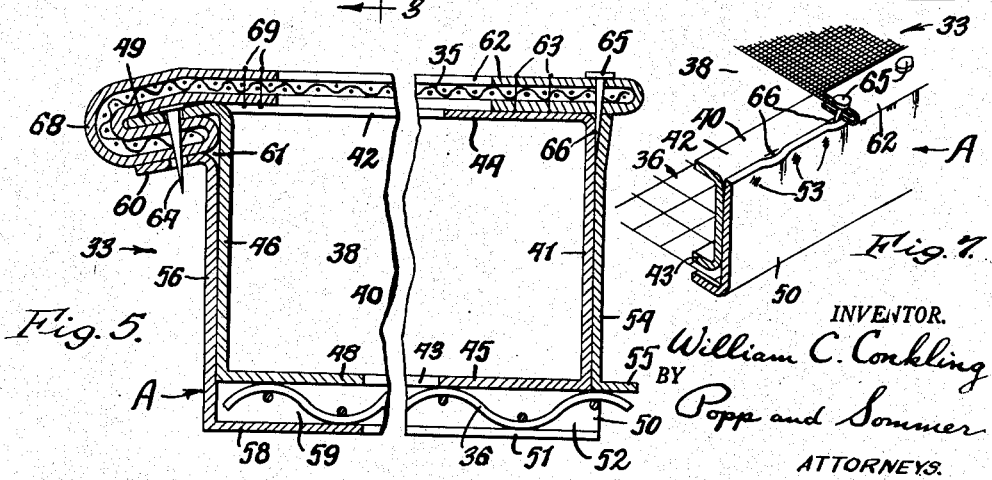
Fig. 5 is an enlarged vertical sectional view of the screen of the top sieve shown in Fig. 4, the central part of the sieve being broken away.
Fig. 7 is a fragmentary perspective view, on a reduced scale, of the right hand side of the screen shown in Fig. 6.

The construction of the rectangular metal frame of the screen 33 will now be described. Referring to Figs. 5 and 7, the rectangular metal frame of the screen 33 comprises a pair of opposing spaced parallel inner side channel bars 40, 40 connected at one end by an inner head channel bar 41. The channel bars 40 and 41 are suitably connected at their joining ends as by welding. The side channel bars 40 are arranged so that their upper and lower flanges 42 and 43, respectively, as well as the upper and lower flanges 44 and 45 of the head channel bar 41, extend inwardly of the rectangular screen frame. An inner tail bar 46 connects the other corresponding ends of the side channel bars 40, such connection being preferably by welding at the ends of this inner tail bar. The inner tail bar 46 has a flange 48 along its lower edge which extends inwardly of the screen frame and along its upper edge has an outwardly turned and slightly downwardly inclining flange 49. The various lower flanges 43, 45 and 48 are arranged in the same horizontal plane and the vertical webs of the various bars 40, 41 and 46 are of the same height so that their upper flanges 42, 44 and 49 lie in substantially the same horizontal plane.

Figure 6:
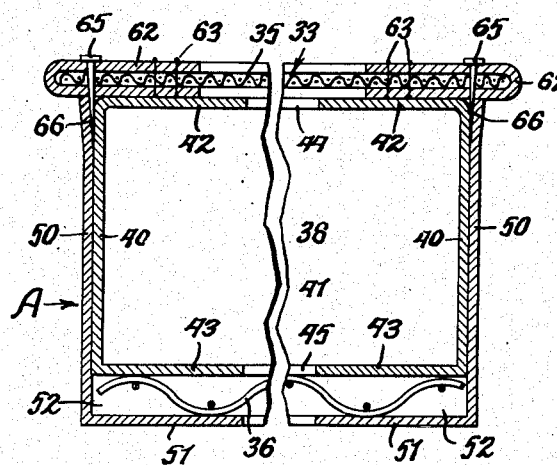
Fig. 6 is an enlarged vertical sectional view of the screen of the top sieve shown in Fig. 3, the central part of the sieve being broken away.

An outer angle side bar 50, which is L-shaped in cross section, is arranged against each of the inner side channel bars 40, as shown in Fig. 6. Each of these L-shaped outer side bars 50 has a flange or rail 51 which extends below the screen frame in spaced and parallel relation to a companion of the lower flanges 43 of the inner channel side bars 40 the companion flanges 43 and 51 forming a pair of rails. Thus a groove 52 is formed along each side of the screen frame and the uncovered ends of these grooves are opposed to each other and open toward the center of the screen frame. The vertical legs or flanges of the outer L-shaped side bars 50 lie flat against the web portion of the inner side channel bars 40 with the upper edges of the vertical legs or flanges of the outer bars 50 lying in substantially the same plane as the upper surfaces of the upper flanges 42 of these inner channel side bars 40. The corresponding inner and outer bars 40 and 50 are connected together adjacent their upper longitudinal edges by a series of spaced spot welds 53, as shown in Fig. 7. The purpose of these weldments will be described hereinafter.

Referring to Fig. 5, an outer angle head bar 54, which is L-shaped in cross section, is arranged against the outer side of the inner head channel bar 41. The outer angle head bar 54 has a flange 55 at its lower end which extends outwardly at a level generally coplanar with the lower flanges 45 and 48 of the inner head and tail bars 41 and 46 respectively. The upper edge of the vertical flange or leg of the outer angle head bar 54 is generally flush with the upper surface of the upper flange 44 of the inner head channel bar 41. The vertical portions of the inner and outer head bars 41 and 54 respectively are connected together by a series of spaced spot welds arranged along their upper edges so as to connect these parts together in a manner similar to the mode of connection employed for the inner and outer side bars 40 and 50, respectively.

Still referring to Fig. 5, an outer tail bar 56 is arranged against the outer surface of the intermediate vertical portion of the inner tail bar 46. The outer bar 56 has an inwardly turned flange 58 at its lower end which extends under the screen frame below and in spaced and parallel relation to the lower flange 48 of the inner tail bar 46. This arrangement provides a groove 59 which forms a continuation of the grooves 52 except running at right angles thereto. The lower flange 58 of the outer tail bar 56 is coplanar with the flanges 51 on the lower ends of the outer side bars 50. The upper end of the outer tail bar 56 is formed to provide an outwardly turned and slightly downwardly inclining flange 60. This flange 60 is arranged below the similar flange 49 on the upper end of the inner tail bar 46 and in spaced relation thereto to provide a groove 61 to receive the tail end of the screen 35 as hereinafter described. The inner and outer tail bars 46 and 56, respectively, are connected together by preferably spot welding their vertical overlying portions at spaced intervals.

The mode of tacking the screening or bolting silk 35 to the upper side of the screen frame will now be described. The bolting silk 35 is cut to rectangular shape and, with fine mesh fabrics, made up for application to the screen frame by securing a tape 62 to its perimeter. On coarse clothing this tape 62 is not used. This tape 62 is applied by bending the same over the edge of the bolting silk 35 to provide web portions on opposite sides of the bolting silk and securing these web portions to the screen in any suitable manner such as by rows of stitching indicated at 63. The tape 62 extends continuously around the perimeter of the screening or bolting silk 35.

When applying the so prepared screening or bolting silk 35 to the upper side of the screen frame, one side or marginal portion is inserted in the groove 61 between the flanges 49 and 60 of the inner and outer tail bars 46 and 56, respectively. The so inserted side or marginal portion is secured by a series of tacks 64, the shanks of which are arranged in registering holes provided in the flanges 49 and 60. These holes, as best shown in Fig. 5, are preferably as large or larger than the corresponding diameter of the shanks of the tacks 64 so that the tacks do not require force to insert them into the holes. It will be noted that the tacks 64 are inserted from above the upper flange 49 so that the heads of these tacks bear against the upper surface of the flange 49. Thereafter the screening or bolting silk 35 is folded over the upper flange 49 so as to extend across the upper side of the screen frame. The attachment of the screening or bolting silk 35 is completed by tacking the remaining three sides to the metal frame. This is accomplished by driving tacks 65 downwardly through the tape 62 and into the crevices 66 between the vertical portions of the inner and outer frame bars 40, 50 and 41, 54 on the two sides and head of the screen frame. When the tacks 65 are so driven into the crevices 66, it will be seen that the shanks of such tacks bulge the body of the vertical flange of the outer frame bar 50 or 54 outwardly to accommodate the tack, as illustrated in Figs. 5, 6 and 7. The tacks 65 are of course inserted at such locations that their shanks will extend into the crevices 66 between the weldments 53. Any desired number of tacks 65 can be employed to properly secure the screening or bolting cloth to the screen frame. In this manner, the screening or bolting silk can be drawn to the desired degree of tautness as the tacks are successively applied.

The portion 68 of the tape embracing the edge of the clothing 35 which is inserted into the groove 61 on the tail side of the screen frame is preferably wider than the rest of the tape 62 since this portion 68 of the tape must be arranged in the groove 61 and also extend over the outwardly projecting flange 49. This tail portion 68 of the tape, like the rest of the tape 62, is preferably secured to the clothing 35 by rows of stitching 69.

With the above mode of attaching the screening or bolting silk 35 to the screen frame, the heads of the tacks 64 are covered along the tail of the screen and these tacks can not become dislodged since the heads of these tacks are firmly clamped between the taut clothing and the flange 49. The heads of the other tacks 65 will also be covered when a sieve is pressed upon this screen as will be explained hereinafter.

Returning again to the screen cleaner carrier or coarse screen 36, this screen is in the form of a rectangular piece of wire having its marginal portions along three sides arranged in the grooves 59 and 52, as shown in Figs. 5, 6 and 7. The other side of this coarse screen 36 is arranged immediately under the outwardly turned flange 55 on the lower end of the outer head bar 54, as shown in Fig. 5. Thus the coarse screen 36 is similar to a drawer which is guided in its in-and-out movement by the side grooves 52. When the coarse screen 36 has been positioned all the way in, its leading edge will fit into the groove 59 extending along the bottom of the tail side of the screen frame. To prevent unintentional displacement of the coarse screen 36 and to insure its positive securement to the screen frame, the central portion of this screen is firmly held to the cross bars 34 by screws 70.

Figure 4:
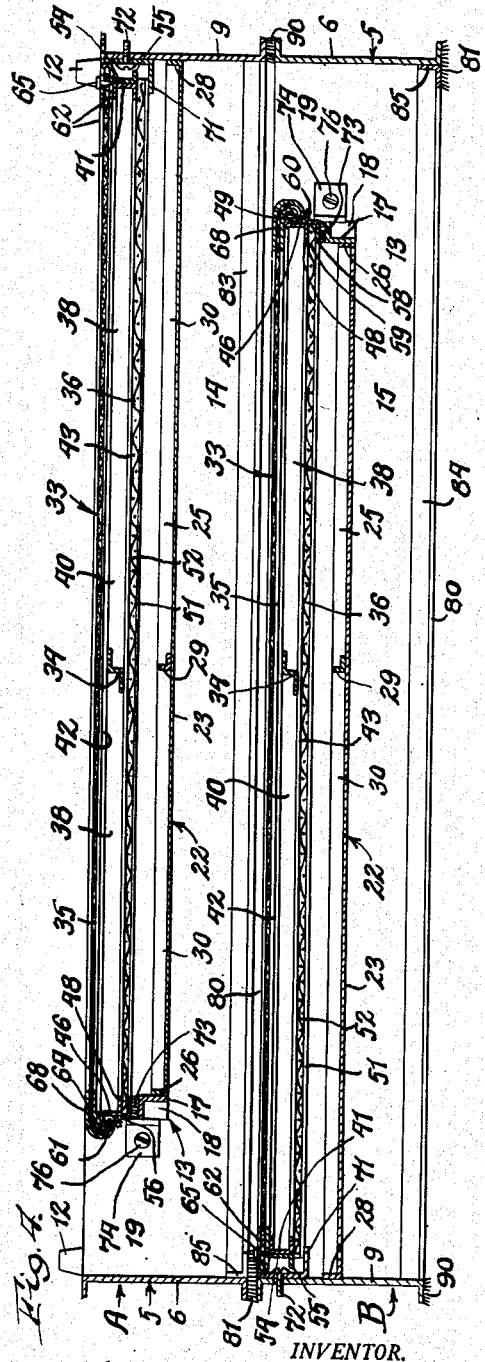
Fig. 4 is a sectional view similar to Fig. 3 but taken on line 4—4 of Fig. 1.

The screen 33 is removably mounted on the sieve frame 5 with the tail end of the screen adjacent the overs opening 19 and the opposite head end of this screen is in juxtaposition to the channel bar 9. The head end of the screen 33 rests on an angle bar 71 secured to the inner face of this channel bar 9 by screws 72, as best shown in Fig. 4. The opposite tail side of this screen 33 rests on the angle bar 17, a strip of plush 73 or other sealing material being preferably interposed between this angle bar 17 and the screen 33 to prevent escape of throughs from the adjacent chambers 30 to the overs opening 19. The screen 33 is held against the inner face of the channel bar 9 of the sieve frame by a pair of L-shaped ears 74 secured to the opposing faces of the channel bars 14 and 15, respectively, by screws 76 or in any other suitable manner and arranged immediately above the cross angle bar 17. These ears 74 engage the corresponding corners of the screen 33 and hold it against the channel bar 9, a piece 78 of plush or other sealing material being preferably interposed between each of these ears 74 and the corresponding corner of the sieve.

Figure 2:
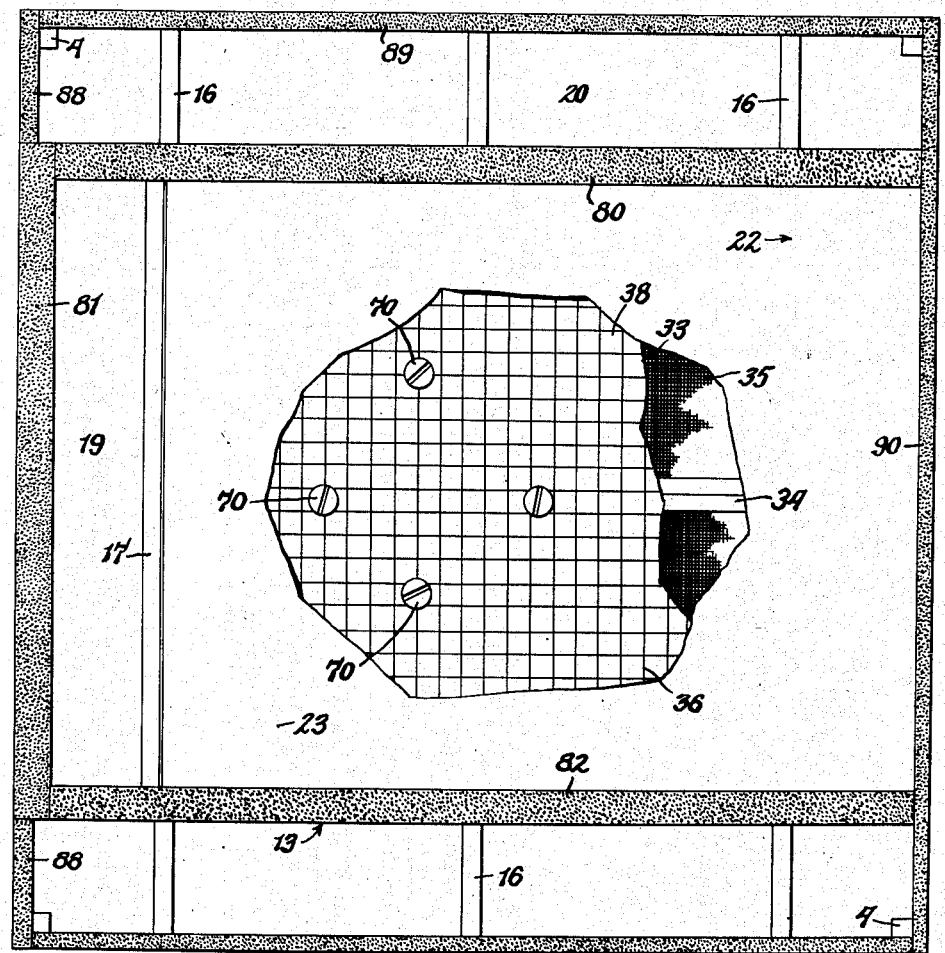
Fig. 2 is a plan view of the bottom of the top sieve shown in Fig. 1.

Referring to Fig. 1, it will be seen that there is a crack between three sides of the screen 33 and the corresponding channel bars 14, 9 and 15 of the sieve frame. A feature of the invention is to seal this crack and at the same time cover the heads of the tacks 65. For this purpose, as best shown in Fig. 2, the bottom of each sieve is provided with three side sealing strips 80, 81 and 82. These strips may be composed of any suitable sealing material and are illustrated as strips of plush. The outer edges of the sealing strips 80 and 82 are coextensive with the outer edges of the outwardly turning lower flanges of the channel bars 14 and 15 of the inner sieve frame 13. Inasmuch as the sealing strips 80 and 82 are wider than these flanges an angle bar 83 is connected to the inner face of the channel bar 14 and a similar angle bar 84 is secured to the channel bar 15. The angle bars 83 and 84 are arranged so that their lower faces form inward extensions of the lower faces of the corresponding outwardly turned lower flanges on the angle bars 14 and 15, as shown in Fig. 3. These angle bars 83 and 84 are preferably welded to the corresponding channel bars, although any other mode of connection may be employed. The sealing strip 82 is cemented or otherwise suitably connected to the lower face of the angle bar 83 and the coplanar lower face of the flange on the lower end of the channel bar 14. Similarly the sealing strip 80 is secured to the angle bar 84 and the lower outwardly turned flange on the channel bar 15. Referring to Fig. 3, it will be seen that the sealing strips 80 and 82 extend across the corresponding cracks between the screen 33 and the respective sieve frame and also cover the heads of the tacks 65.

The sealing strip 81 is similarly arranged on the lower face of the outwardly turned lower flange of the channel bar 6 and the lower face of an angle bar 85 spot welded to the inner face of this channel bar along its lower edge, as shown in Fig. 4. The sealing strip 81 extends across the crack between the screen 33 and the channel bar 9 of the next lower sieve.

In this manner the crack along the head end of the screen and the two contiguous sides is effectively sealed and at the same time the heads of the tacks 65 are covered, by the next higher screen.

To provide a seal around the outer perimeter of adjacent sieves, a sealing strip 88 narrower than the seal strip 81 is provided at each end of the latter along the lower flange of the channel bar 6. Similar narrow sealing strips 89, 90 and 91 are arranged along the lower flanges of the channel bars 10, 9 and 8 respectively.

Referring to Figs. 3 and 4, it will be seen that the sieves A and B are not precisely identical in construction, the only difference being, however, that one is a so-called "right" and the other a "left." As illustrated, the usual arrangement of the sieves is such that they are reversed 180° with respect to each other so that, as shown in Fig. 4, the overs passing over the tail end of the screen of the upper sieve A drop through the corresponding overs opening 19 onto the head end of the screen of the lower sieve B. On the other hand, with such a reversal of identical screens A and B, the throughs channel 20 of the screen A would be on the opposite side from the throughs channel B. It is usually desirable to have the throughs channels 20 of the stack of sieves in register with each other so that the channels opposite these channels 20 can be used for other purposes. Accordingly the sieves A and B are provided in rights and lefts so that the throughs channel 20 of the screen A is on the bottom as viewed in Fig. 1 and the same throughs channel 20 of the sieve B is also at the bottom as viewed in this same figure.

It will be noted that with each screen 33 arranged in its corresponding sieve frame 5 the free end of the screen cleaner carrier or coarse screen 36 is adjacent the angle bar 71 secured to the inner face of the channel bar 9. With this arrangement the coarse screen 36 cannot be displaced from the lower side of the corresponding screen frame even though its fastenings 70 should become dislodged.

It will also be noted that in the assembled condition of the sieves in a stack that the tail end of each screen overhangs slightly to guide the overs into the corresponding overs opening 19 and it will be further noted that the tack fastenings along this tail end of the screen are completely covered. As previously explained, in the assembled condition of the sieves, the tacks 65 along with the other three sides of the sieve are covered by the sealing strips 80, 81 and 82.

In case it is necessary or desirable to replace the clothing or bolting silk 35 in any screen 33, such clothing can be readily removed by first removing the tacks 65 along the three sides of the screen by pulling the shanks of these tacks out of the crevices 66 into which they were driven. This frees the three sides of the screening which can thereafter be folded back away from the flange 49 along the tail side or end of the screen to expose the heads of the tacks 64. These tacks can then be removed and thereafter the clothing 35 can be completely removed from the other side of the screen frame. A new screen cloth properly prepared or initially made up with the tape edges 62 and 68 can then be applied to the screen frame by following the procedure previously described. In applying a replacement clothing 35, it may be found that the crevices 66 are too wide to hold the shanks of the tacks 65 which are to be employed to fasten the replacement screening to the sieve frame. If such is the case, it is a simple matter and a feature of the invention to hammer flat the outward bulges along the upper edges of the outer screen frame bars 50 and 54. In this manner the screen frame can be used over and over again many times with new screenings 35 being applied to the screen frame with an effective securement in every case.

From the foregoing it will be seen that the present invention provides a metal sieve in which the clothing is readily replaced, the securing tacks are prevented from going through with the product, the sieves are effectively sealed against the escape of overs into throughs and vice versa, and accomplishes the other objects set forth.

I claim:

1. A screen for a gyrating or reciprocating sifter, comprising a rectangular frame having a tail end and a head end opposite therefrom and two sides between said ends, said head end and said two sides each comprising an inner metal channel bar arranged with their corresponding upper and lower flanges coplanar with one another and projecting inwardly of said frame, an L-shaped outer metal side bar arranged against the outer side of the web portion of the inner channel bars on said two sides and having a flange at its lower end turned inwardly of said frame and arranged below and in spaced relation to the lower flanges of the two side inner channel bars to provide a pair of opposing and parallel grooves, an inner metal tail bar arranged across said tail end and having an outwardly turned flange at its upper end and an inwardly turned flange at its lower end, said inwardly turned lower flange being coplanar with the lower flanges of said two side inner channel bars, an outer metal tail bar arranged across said tail end against the outer side of the intermediate portion of said inner tail bar and having an outwardly turned flange at its upper end arranged below the similar flange on said inner tail bar and an inwardly turned flange at its lower end arranged below and in spaced relation to the lower flange of said inner tail bar and coplanar with the lower flanges of said L-shaped bars, an L-shaped outer metal head bar arranged against the outer side of the channel shaped inner head bar and having an outwardly turned flange at its lower end arranged generally coplanar with the lower flange of said inner head bar, a foraminous screen cleaner carrier of rectangular outline covering the lower side of said frame and having its marginal portion on three sides received in the spaces between the lower flanges on the head end and two sides of said frame and adapted to be slid along such lower flanges on the two sides of said frame past said head end for removal and reinsertion on said frame, removable fastenings securing said carrier to said frame, the upper edges of the two outer side and outer head bars being generally flush with the upper surface of the upper flanges on the two inner side and inner head channel bars to provide a crack exposed to the upper side of said frame, said inner and outer bars on the two sides and head end being spot welded together adjacent said crack at spaced intervals therealong to provide a series of crevices, a screening of rectangular outline covering the upper side of said frame, one of the marginal portions of said screening extending over the upper outwardly turned flange on the tail end and being folded over the outer edge of such flange and the outer extremity of such marginal portion being arranged between the outwardly turned flanges on said tail end, tacks having their shanks driven through said last mentioned flanges and the intermediate marginal portion of said screening and having their heads covered by said screening, and additional tacks securing the marginal portions of said screening along the remaining three sides thereof to the upper side of the two sides and head end of said frame, said additional tacks having their shanks penetrating said screening and driven into said crevices.

2. In a screen for a gyrating or reciprocating sifter, a rectangular frame comprising four outer elongated metal bars connected together at their meeting ends and each of three of which have bottom flanges projecting inwardly toward one another to provide a three-sided shelf around three sides of said frame, four inner elongated metal bars each secured to the inner face of a companion outer frame bar and each having a bottom flange, said last bottom flanges being spaced above said first bottom flanges and projecting inwardly toward one another to provide with said first bottom flanges a three-sided groove, the fourth outer frame bar having its lower edge disposed above the plane of said groove, a screening covering the side of said frame opposite said flanges and secured along its perimeter to the frame, and a foraminous screen cleaner carrier of rectangular outline having three of its edges slidingly received in said three-sided groove and its fourth edge disposed adjacent the lower edge of said fourth outer frame bar.

References Cited in the file of this patent

UNITED STATES PATENTS

| Number | Name | Date |
| --- | --- | --- |
| 696,831 | Marmon | Apr. 1, 1902 |
| 1,397,337 | Sturtevant | Nov. 15, 1921 |
| 1,906,603 | Hungerford | May 2, 1933 |
| 2,068,413 | Hunsicker | Jan. 19, 1937 |
| 2,181,605 | Norvell | Nov. 28, 1939 |
| 2,455,383 | Pickard | Dec. 7, 1948 |
| 2,457,250 | Macomber | Dec. 28, 1948 |
| 2,576,794 | Jost et al. | Nov. 27, 1951 |